H. B. SMITH.
COIL WINDING APPARATUS.
APPLICATION FILED MAY 9, 1907.
933,792.
Patented Sept. 14, 1909.
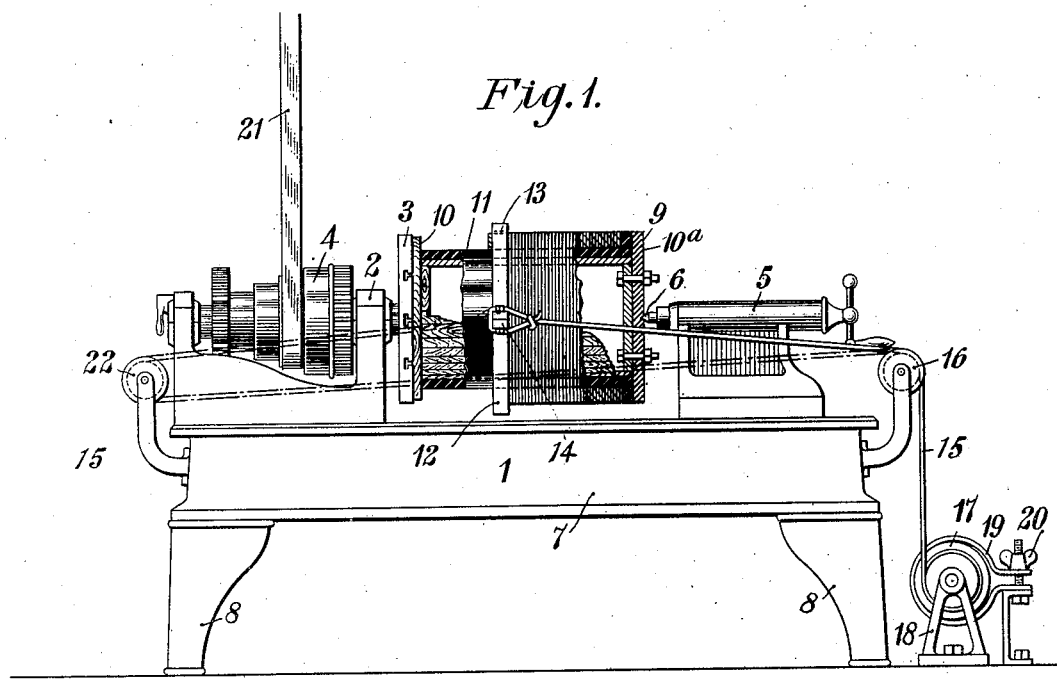
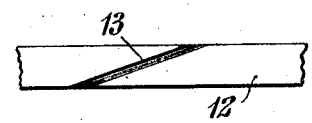
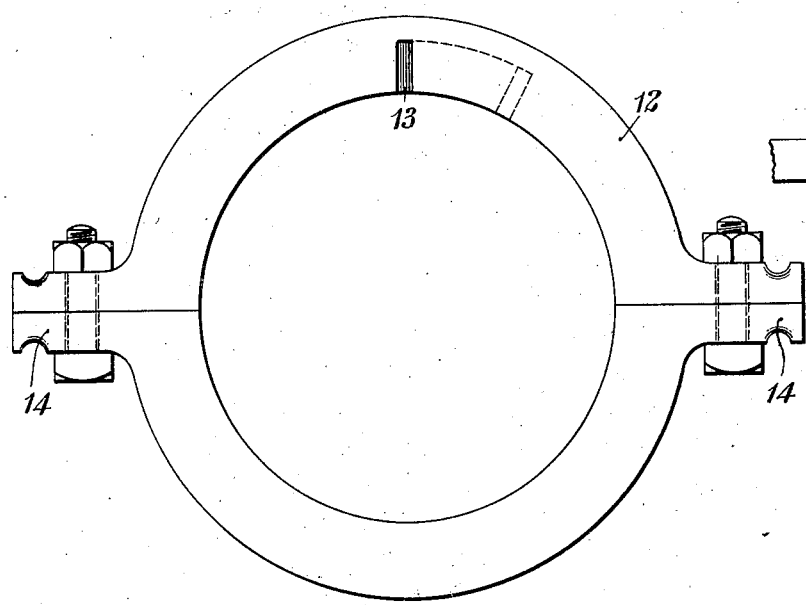
WITNESSES:
C. L. Belcher
R. J. Dearborn
INVENTOR
Harold B. Smith
BY
Kiley G. Carr
ATTORNEY

UNITED STATES PATENT OFFICE.

HAROLD B. SMITH, OF WORCESTER, MASSACHUSETTS, ASSIGNOR TO WESTINGHOUSE ELECTRIC & MANUFACTURING COMPANY, A CORPORATION OF PENNSYLVANIA.

COIL-WINDING APPARATUS.

933,792.   Specification of Letters Patent.   Patented Sept. 14, 1909.

Application filed May 9, 1907. Serial No. 372,731.

*To all whom it may concern:*

Be it known that I, HAROLD B. SMITH, a citizen of the United States, and a resident of Worcester, in the county of Worcester and State of Massachusetts, have invented a new and useful Improvement in Coil-Winding Apparatus, of which the following is a specification.

My invention relates to the manufacture of helical coils for transformers and other electrical apparatus and it has for its object to provide a simple and effective means for winding coils of the class above indicated whereby very thin strap conductors may be advantageously employed.

In a co-pending application, Serial No. 333,115, I have illustrated and described an electrical transformer having an improved winding which consists of a plurality of cylindrical coils. High voltage coils of this type may be preferably formed of a very thin strap conductor wound on edge so that each turn of the completed coil is accessible to some insulating and cooling fluid, such as oil, in which the winding is immersed.

Although the advantages to be obtained from the use of a coil of the aforesaid type are readily understood by those skilled in the art, it has been considered impracticable to construct such coils by reason of the difficulties encountered in the winding process. These difficulties are entirely overcome by the means constituting my present invention whereby cylindrical coils five feet in length, two and one half feet in diameter and containing over 1700 turns of very thin cotton covered copper wire wound on edge, have been readily constructed.

In the accompanying drawings Figure 1 is a view, partially in section but mainly in elevation, of a winding machine, embodying my invention, and a coil in process of construction thereon; and Figs. 2 and 3 are detail views of a pressure ring shown in Fig. 1.

Referring to the drawings, a turning lathe or winding machine 1 comprises a headstock 2 which supports a rotating face plate 3 and a driving pulley 4, a tail-stock 5 having a dead center 6, and a stationary bed plate 7 which may be supported by any convenient means, such as legs 8. A form or frame 9 of suitable shape and material, here shown as a wooden drum provided with end flanges 10 and 10ª, is rotatably mounted between the parts 3 and 6 to receive the strap conductor and bend it into a helix.

The coil may be wound directly upon the drum or upon a sleeve or spool 11 with which the drum is provided.

The insulating spool or sleeve 11 may be either formed by winding a strip of insulating material thereon, in the desired number of layers or it may be separately formed and be slipped onto the drum, one of the end flanges being made detachable to permit this to be done. In order to exert a longitudinal pressure against the turns of the coil during the winding operation without interfering with the formation of the coil, I provide a segmental ring 12 (usually comprising two parts) having a diagonal slot or groove 13 through which the conductor, of which the coil is constructed, may pass. The ring 12 is fitted loosely over the spool or sleeve 11, or over the drum 9, as the case may be, so that the rotation of the latter is permitted while the ring itself is held stationary, projections 14 being provided at diametrically opposite points of the ring. The ring 12 is forced toward the flange 10ª by means of cords or cables 15 which are attached to the projections 14 and are passed over pulleys 16 and wound upon friction drums 17. The drums 17 are rotatably mounted in bearing brackets 18 and are held against free rotation by means of a brake band 19 which is adjustably held in position by a screw clamp 20. Weights or other devices may be employed in lieu of the friction drums, if desired.

The winding process comprises the following steps: After the ring 12 is placed in position upon the drum 9 the free end of the conductor is passed through the groove 13 in the ring and is attached to the end flange 10ª, the drum is then rotated by means of power applied to the pulley 4, from any suitable source, through a belt 21. As the drum is rotated, the conductor is squeezed into the space between the end flange 10ª and the ring 12, thereby forcing the ring along the cylinder in opposition to the force exerted by cords 15 and the friction drums 17.

Pulleys 22 are mounted at the opposite end of the bed plate 7 so that the cords or cables 15 may extend from the ring 12 around them and thence over the pulleys 16 to the drums 17, as indicated by dotted and broken lines in Fig. 1, to produce a pressure between the ring 12 and the flange 10 at the opposite end of the drum 9, in case it is desired to begin the winding operation at the end having the flange 10.

It will, of course, be readily understood that the diagonal groove 13 is so formed and arranged as to produce the least possible bending or kinking of the conductor during the winding operation.

In some instances it may be desirable to mount the form or frame 9, for rotation about a vertical axis, or some other axis, making an angle of less than 90° therewith, in which case, the friction drums 17 and the cords or cables may be replaced by weights attached to or forming a part of the ring 12, and I desire, therefore, that my invention shall not be limited to a machine having its winding axis located in any one specific plane.

I claim as my invention:

1. A coil-winding machine comprising a substantially cylindrical form rotatably mounted upon a horizontal axis and having a removable sleeve or spool thereon, and a ring loosely fitted over the sleeve or spool and having a diagonal slot or groove in its inner cylindrical surface.

2. A coil-winding machine comprising a substantially cylindrical form which is mounted to rotate in a horizontal plane, a ring loosely fitted onto the cylindrical form and having a diagonal slot or groove in its inner surface through which a strap conductor may pass edgewise to the form.

3. In a coil-winding machine, the combination with a horizontally rotatable drum having an end flange and provided with an insulating sleeve or spool, of a ring loosely fitted over the sleeve or spool and having a diagonal slot in its inner surface, and means for exerting a substantially constant force upon the ring in such direction as to tend to move it toward the flange.

In testimony whereof, I have hereunto subscribed my name this fourth day of May, 1907.

HAROLD B. SMITH.

Witnesses:
J. O. PHELON,
S. W. FARNSWORTH.